Figure 1:
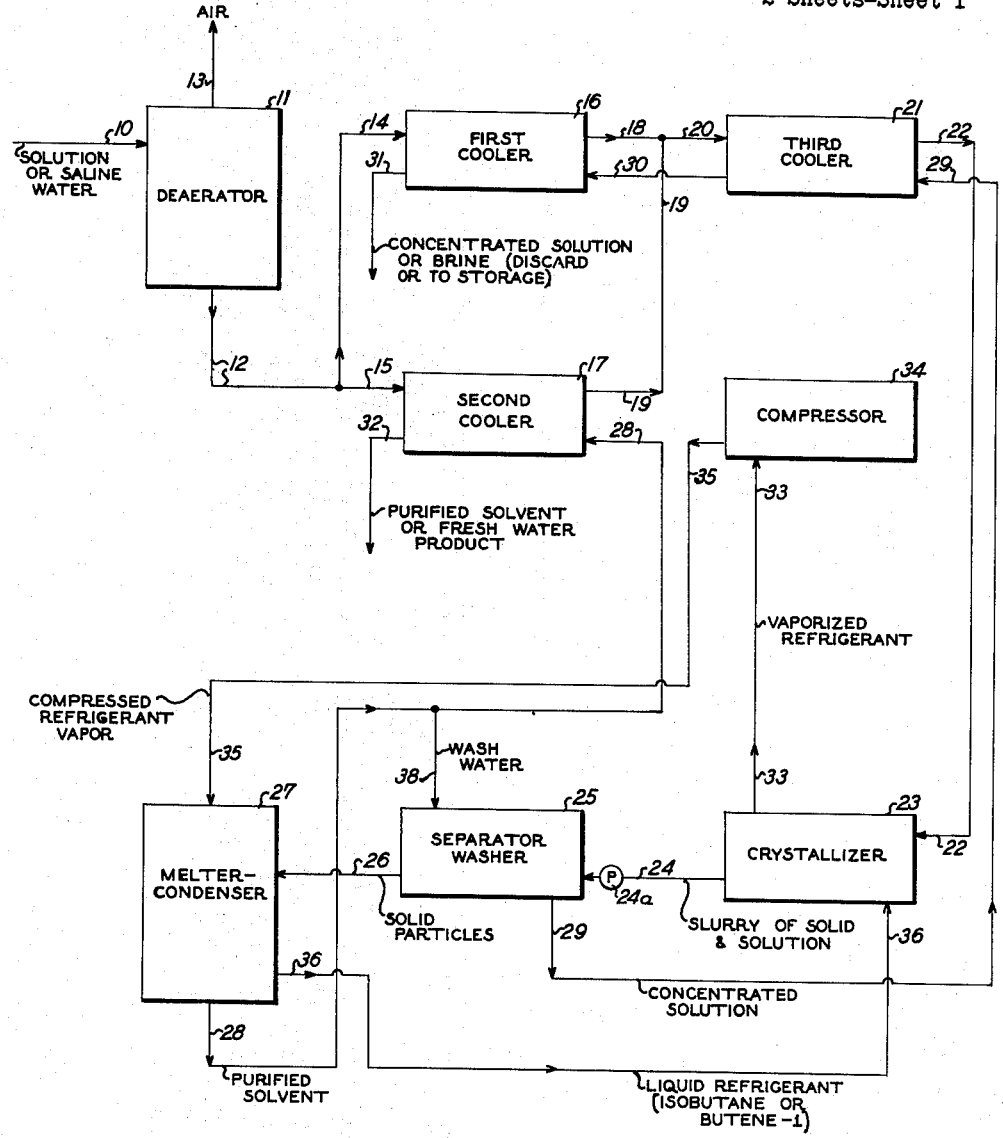

United States Patent Office 3,095,295
Patented June 25, 1963

3,095,295
CHEMICAL PROCESS
John White Colton, Pelham Manor, N.Y., assignor to Scientific Design Company, Inc., a corporation of Delaware
Filed Sept. 22, 1960, Ser. No. 57,748
11 Claims. (Cl. 62—58)

This invention relates to processes for treating solutions in order to separate solvent therefrom, more particularly to such processes for preparing fresh or potable water from sea water or brackish water (containing over 500 p.p.m. dissolved solids), and especially to such a process wherein the saline water is partially frozen, the resulting ice is separated from the remaining salt water, and this ice is melted to give fresh or potable water, with the provision of semi-direct heat exchange methods and means for most economical use of energy, including vaporizing water from the incoming or feed saline water and contacting the vapor with either the outgoing product or the spent brine so that the vapor is condensed and co-mingled with either the product or the spent brine, respectively, in an adiabatic manner.

Various proposals have been made for recoving potable water from sea water or the like materials, including direct or indirect cooling and freezing, and separation of frozen relatively pure water from the more concentrated liquid saline water. However, these processes are relatively costly to operate as well as to build, and accordingly their commercialization has been retarded. The art is confronted by the problem of providing processes for recovery of fresh or potable water from saline water at economically low operating costs and at attractively low capital investment.

The discoveries associated with the invention relating to solution of the above problems and the objects achieved in accordance with the invention as described herein include the provision of:

A process for recovering a solvent from an initial solution involving selectively freezing a part of the solvent in the latter, and separating as first portion frozen relatively pure solvent from more concentrated solution as a second portion, including passing sensible heat from the incoming solution to at least one of the separated portions via vapor of said solvent, adiabatically;

Such processes wherein the solution is sea water and the vapor removed from the initial sea water is contacted with the separated portion stream in a counter-current manner;

Such processes wherein the system is maintained under a lowest pressure in the range of 3 to 60 mm. Hg, e.g., 4 or 8 mm. Hg, for sea water; and Other objects which will be apparent as details or embodiments of the invention are set forth hereinafter and in the drawings.

Figure 2:
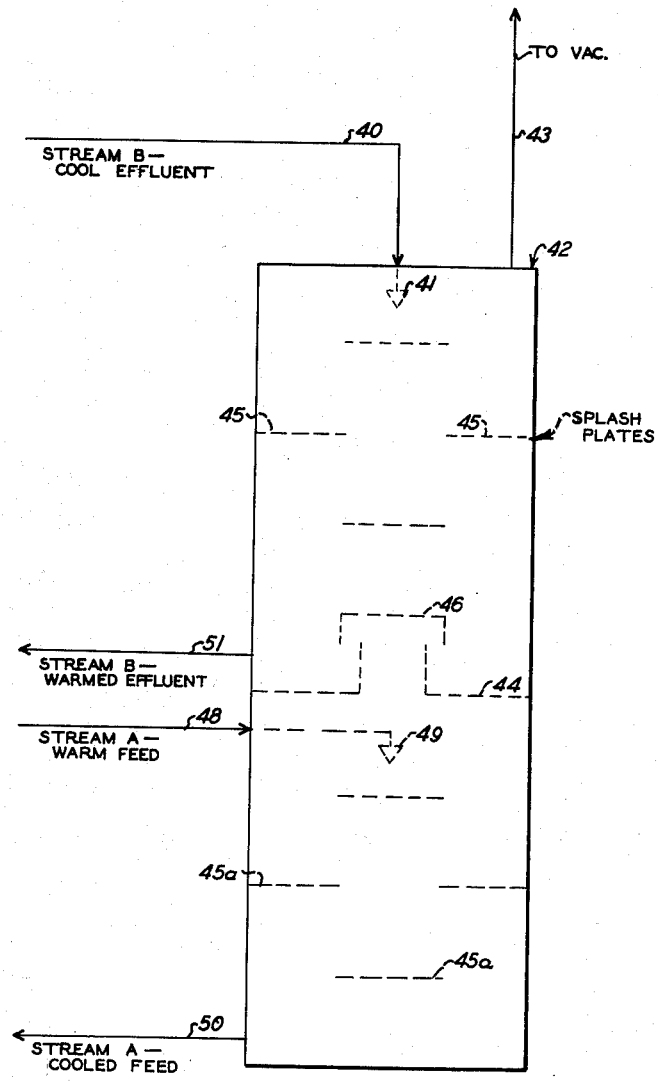

FIGURES 1 and 2 in the accompanying drawings are schematic illustrations of preferred embodiments of the invention.

In order to indicate still more fully the nature of the present invention the following examples of typical procedures are set forth in which parts and percent mean part and percent by weight, respectively, unless otherwise indicated, it being understood that these examples are presented as illustrative only and are not intended to limit the scope of the invention.

*Example 1*

Referring to FIGURE 1, saline water enters through line 10. It is deaerated in vessel 11 by the application of vacuum and heat or steam. Air and other non-condensible dissolved gases pass out through the vacuum line 13. A portion (e.g. two thirds) of the deaerated saline water is passed through lines 12 and 14 into a first cooler 16 and the remainder is passed through line 15 into a second cooler 17. The cooled outlet saline water from both coolers is led through lines 18 and 19 and passed through line 20 into third cooler 21. The outlet cooled saline water from third cooler 21 is passed through line 22 into crystallizer 23.

In this example of the invention, each of the coolers is a flash vessel as illustrated in FIGURE 2. The warm stream from line 14, 15 or 20 (stream A) enters through line 48 and is sprayed through spray head 49 into the lower section of vessel 42 maintained at reduced pressure by means of a vacuum system (not shown) operating through line 43. There is a pressure gradient in the vessel, the upper end being at the lowest pressure. The droplets of sprayed liquid are further broken up or changed in size by splashing against splash plates 45a. Some liquid vaporizes. The vapor passes upward through the vessel 41; i.e. through the riser in bubble-cap tray 44 and around cap 46.

The cool effluent from line 28, 29 or 30 (stream B) is passed into the upper region of the upper section of vessel 42 via line 40 and spray head 41 and in descending, the liquid contacts splash plates 45. The ascending vapor contacts the cool liquid and condenses on and remains with the liquid.

The cooled feed (stream A) is withdrawn through line 50 and is passed through line 18, 19 or 22 to the next stage of the process, e.g., by gravity flow or a pump (not shown). The warmed effluent (stream B) containing the added water is removed from tray 44 from the lower region of the upper section of vessel 42 through line 51 and line 30, 31 or 32.

The saline water is crystallized by methods such as evaporative freezing in the crysallizer in order to produce ice crystals and brine. A liquid refrigerant (such as isobutane or butene-1) is mixed therewith and vaporized. The ice crystals and brine are led through line 24 into separator-washer 25 and after separation of the brine e.g. by gravity or filtration and washing (with water added through line 38) to remove entrained brine, the ice crystals are passed through line 26 into melter condenser 27 where by direct heat exchange the crystals are melted to form fresh water which is passed through line 28 into the cooling side of the second cooler 17 in order to cool the saline water passing into the second cooler. The fresh water passes out of the second cooler 17 through line 32 and is taken off as fresh water product. The brine which is removed from the separator-washer 25 through line 29 is first passed through the cooling side of third cooler 21 and is then passed through line 30 into the cooling side of first cooler 16 to cool the saline water. The brine passing out of first cooler 16 is then removed through line 31.

The refrigerant vapors are passed via line 33 to compressor 34, and compressed. The compressed vapors are passed via line 35 to vessel 27 where they are liquefied, and the refrigerant liquid is passed via line 36 to the crystallizer.

Raw sea water at 80° F. is fed into the deaeration column and air is stripped and removed overhead. The deaerated sea water passed out of the bottom of the column at 85° F. and is split into two streams, approximately two-thirds passing through a first cooler and the remainder passing through a second cooler. The coolers are sized so that the deaerated waters passing out of both coolers are at about the same temperature.

A stream of 10,000 lbs. per hour of warm sea water (as from the Arabian Gulf) passes at 85° F. from the deaerator through pipe 48 and spray head 49 into vessel 42 in which, at this point, the pressure is about 16 mm. Hg a.b.s. In splashing down across plates 45a, 200 pounds per hour of water evaporates, cooling the sea water to 66° F. in the first cooler. 10,000 pounds per hour of cool brine from the process enters through pipe 40 and spray head 41 into vessel 42 at 41° F. and condenses the vapors which have passed upward through cap 46, thereby rising in temperature to 60° F. At the top of vessel 42 a reduced pressure of about 7 mm. Hg is maintained by a vacuum system (not shown) connected through line 43.

Similarly, 5,000 pounds per hour of warm sea water from the deaerator enters the second cooler at 85° F. and is reduced in temperature to 62° F. by the vaporization of 100 pounds of water and the condensation of this water vapor on 5,000 pounds per hour of cold fresh water from the melter-condenser.

The effect of the solute on the vapor pressure of the solvent is small and may be neglected as a practical matter; e.g. the normal boiling point of a 3.5 percent solution of ocean salts in water is 1° F. above the boiling point of pure water; the normal boiling point of a 5 percent solution of ocean salts is 1.5° F. above the boiling point of pure water. In the present range of interest, at 38° F. the vapor pressure of pure water is 5.81 mm. Hg. The vapor pressure of ocean water containing about 3.5 percent salts is about 5.79 mm. Hg. Clarification and exposition of the basic concepts of this invention would be impeded by making minor adjustments to temperatures and/or operating pressure to accomodate this phenomenon.

The two outlet streams are combined into a single stream which is passed into a third cooler where it gives up water vapor (at a pressure of above 4 mm. Hg) and is cooled to a temperature of 52° F. and then it is passed into a crystallizer. Liquid isobutane is introduced into the crystallizer and contacted with the cooled dearated water to form ice crystals and brine. The temperature in the bulk of the liquid in the crystallizer is maintained at 28° F. by recirculating the liquid through the crystallizer. Vaporized isobutane is removed overhead at a temperature of 28° F. and passed into a compressor. A mixture of ice crystals and brine is passed onto a continuous moving filter belt from which the bulk of the brine is drained by gravity flow in a first section of the moving belt. The weight of the ice crystals is approximately one-third of the weight of the raw sea water. The crystals are then washed with water and are passed into a melter-condenser where they are contacted with the isobutane passing out of the compressor and melted to form fresh water. The isobutane condenses during the contacting step. Part of the fresh water is passed into the separator-washer to supply the wash water and the remainder passes out of the bottom of the melter-condenser at 33° F. and is led to coolant inlet of the second cooler. The fresh water leaves the second cooler and is stripped of dissolved isobutane in a fresh water stripper (not shown) operated at reduced pressure. Stripped fresh water is removed from the bottom of the stripper and collected as product. There is obtained an overall conversion of raw sea water (containing about 3.5 percent dissolved solids) to fresh water (containing not over 500 p.p.m. dissolved solids) of approximately one-third by weight. The brine at 28° F. which is separated from the ice crystals on the moving belt is passed to the coolant inlet of the third cooler and is then passed into the coolant inlet of the first cooler at a temperature of 41° F. The brine leaves the outlet side of the first cooler and is stripped of dissolved isobutane in a stripper (not shown) operated at reduced pressure and passes out of the bottom of the stripper as spent brine. The stripped isobutane from the brine and the fresh water strippers is compressed, condensed and passed back into the melter-condenser.

Although isobutane or butene-1 or mixtures thereof are preferred refrigerants, any water-immiscible refrigerant boiling broadly in the range of from about 0° to about 35° F., desirably 10° to 30° F., and preferably 13° to 25° F. can be utilized in the process, including close-boiling mixtures of such refrigerants.

Following the above procedures, analogous separations may be made of systems having non-aqueous solvents, using analogous solvent-immiscible refrigerants, and substantially adiabatic conditions.

In view of the foregoing disclosures, variations and modifications thereof will be apparent to one skilled in the art, and it is intended to include within the invention all such variations and modifications except as do not come within the scope of the appended claims.

What is claimed is:

1. In a process for recovering fresh water from saline water wherein the saline water is directly contacted with a liquid refrigerant, wherein the liquid refrigerant is vaporized thereby forming ice crystals and brine, wherein said ice crystals are separated and melted, and wherein fresh water and brine are withdrawn as products, the improvement of cooling the saline water by vaporizing a portion thereof in a zone continuously maintained under a vacuum, condensing said vapors by contact with at least one of said products in said zone, thereby transferring heat from said saline water to said product, and maintaining the zone under substantially adiabatic conditions.

2. The process of claim 1 wherein said product is countercurrently contacted with said vapor.

3. The process of claim 1 wherein said reduced pressure zone is at a pressure of at least 3 mm. Hg.

4. In a process for recovering fresh water from saline water wherein the saline water is directly contacted with a liquid refrigerant, wherein the liquid refrigerant is vaporized thereby forming ice crystals and brine, wherein said ice crystals are separated and melted, and fresh water and brine are withdrawn as product, the improvement of introducing said saline water into the top of the lower portion of a zone continuously maintained under a vacuum, vaporizing a portion of said saline water, passing said vapor into the upper section of said zone, countercurrently contacting said vapor with at least one of said products, thereby condensing at least a portion of said vapor therein, withdrawing said product containing said condensed vapor from the upper portion of said zone and withdrawing said saline water from the bottom of the lower portion of said zone, thereby transferring heat from said saline water to said product, and maintaining said zone under substantially adiabatic conditions.

5. The process of claim 1 wherein said vapor passes upwardly through a bubble cap tray and said product and condensed vapor is withdrawn from said bubble cap tray, said product being dispersed as it passes into and through said zone.

6. The process of claim 4 wherein said vapor passes upwardly through a bubble cap tray and said product and condensed vapor is withdrawn from said bubble cap tray, said product being dispersed as it passes into and through the upper section of said zone.

7. The process of claim 4 wherein said reduced pressure zone is between 3 and 60 mm. Hg.

8. The process of claim 1 wherein the vapors are condensed with the fresh water.

9. The process of claim 1 wherein the saline water flows downwardly during vaporization and said products flow downwardly while condensing said vapor.

10. The process of claim 4 wherein the saline water flows downwardly in the lower portion of said reduced pressure zone and the product flows downwardly in the upper portion of said zone.

11. The process of claim 4 wherein said fresh water is used to condense said vapor.

(References on following page)

References Cited in the file of this patent

UNITED STATES PATENTS

| | | |
|---|---|---|
| 2,749,094 | Lewis et al. | June 5, 1956 |
| 2,821,304 | Zarchin | Jan. 28, 1958 |
| 2,847,832 | Johnson | Apr. 19, 1958 |
| 2,997,856 | Pike | Aug. 29, 1961 |

FOREIGN PATENTS

| | | |
|---|---|---|
| 70,507 | Norway | June 3, 1946 |

OTHER REFERENCES

Carrier publication, Development of a Direct Freezing Continuous Wash—Separation Process for Saline Water Conversion, Report Number 23, January 1959, pages 1–3 and Figures 1 and 2.

Gilliland: "Fresh Water for the Future," Industrial and Engineering Chemistry, volume 47, Number 12, pages 2410–2422, December 1955.